United States Patent Office.

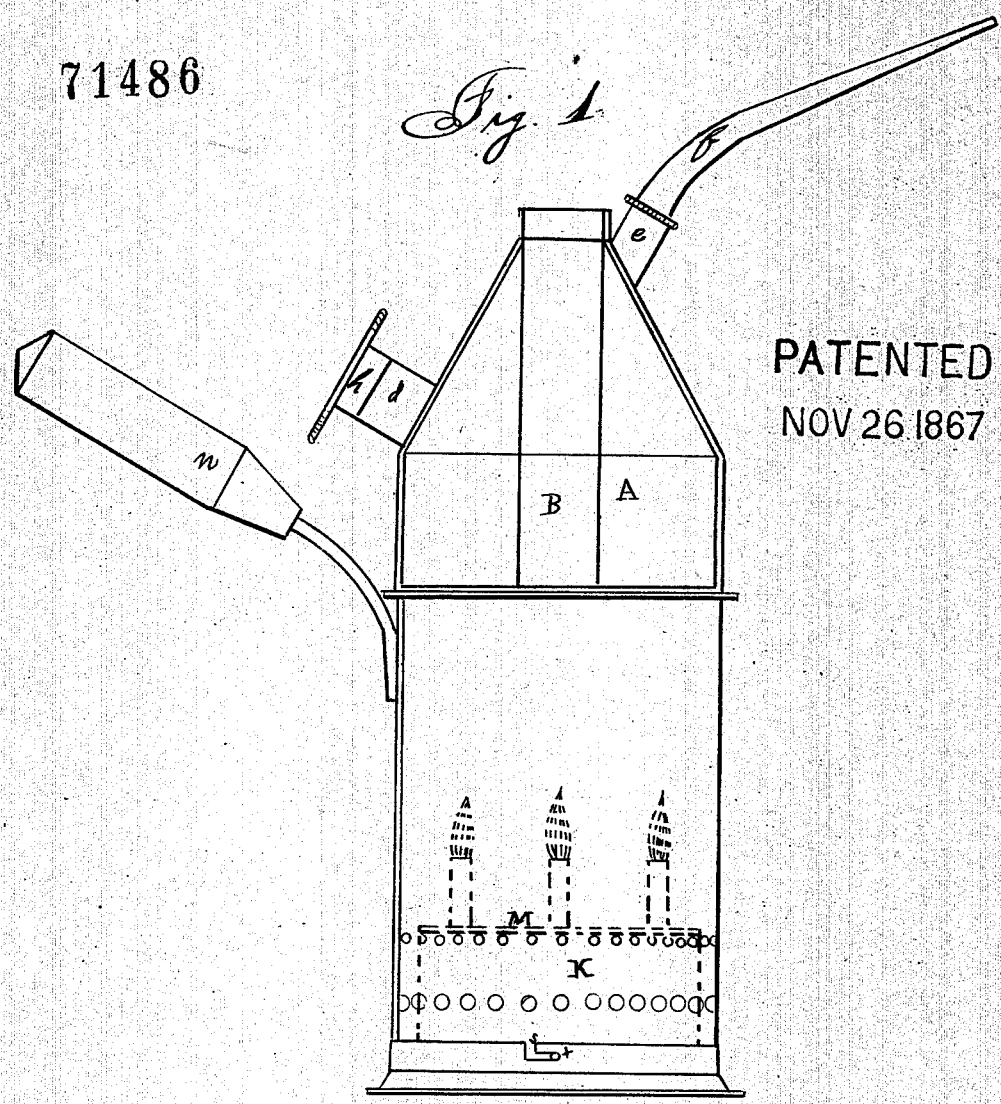
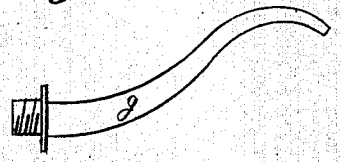

HENRY HILL AND LLEWELLYN E. P. BUSH, OF LEXINGTON, KENTUCKY.

*Letters Patent No. 71,486, dated November 26, 1867.*

IMPROVED APPARATUS FOR KILLING INSECTS.

*The Schedule referred to in these Letters Patent and making part of the same.*

TO ALL WHOM IT MAY CONCERN:

Be it known that we HENRY HILL and LLEWELLYN E. P. BUSH, of Lexington, in the county of Fayette, and State of Kentucky, have invented certain new and useful Improvements in Killing Bed-Bugs; and we do hereby declare that the following is a full, clear, and exact description thereof, reference being had to the accompanying drawings, and to the letters of reference marked thereon, which form a part of this specification.

Figure 1, in the annexed drawings, represents a side elevation of our machine; exhibiting one form of the spout to be used.

Figure 2 exhibits another form of the spout.

The letter A represents the heater, which may be made of tin or other suitable material, the upper part being formed funnel-shaped. The heater has a flue, B, passing through its centre, and is furnished with tubes $d$ and $e$, the tube $d$ being designed as the channel through which the water is poured into the heater A, and $e$ being intended to receive the spouts $f$ and $g$, which are used for conveying the water into crevices, where the bugs conceal themselves. The tube $d$ is provided with an adjustable cap, $h$, the object of which is to keep up the temperature of the water in the heater, by preventing evaporation. K represents a sheet-iron cylinder fastened securely to the lower edge of heater A. M designates an adjustable lamp, fitted on the lower end of cylinder K, and kept in position by means of the knob $t$, on the cylinder K, which enters the slot $s$, in the rim of the lamp. Into the top of lamp K are inserted three wick-tubes, equidistant apart. The top of the lamp is made adjustable. In order to supply the flames with air when the lamp is in position, the cylinder has numerous perforations near its lower end. On the same side with tube $d$, the handle $n$ is placed.

The advantages which we claim for our invention are twofold: first, we are enabled to keep the water in the heater A at a boiling-point, when used for exterminating bugs; second, by means of one or the other of the spouts, we can introduce the scalding fluid into all crevices and knot-holes about a bedstead.

Having thus described our invention, what we claim, and desire to secure by Letters Patent, is—

The heater A, provided with flue B, cylinder K, and adjustable tubes $g f$, as and for the purpose set forth.

In testimony that we claim the foregoing as our own, we affix our signatures in presence of two witnesses.

HENRY HILL,
LLEWELLYN E. P. BUSH.

Witnesses:
JNO. M. MITCHELL,
M. L. MITCHELL.